US010929615B2

(12) United States Patent
Badenes et al.

(10) Patent No.: US 10,929,615 B2
(45) Date of Patent: *Feb. 23, 2021

(54) TONE ANALYSIS OF LEGAL DOCUMENTS

(71) Applicant: International Business Machines Corporation, Armonk, NY (US)

(72) Inventors: Hernan Badenes, San Martin de los Andes (AR); Rosanna S. Mannan, San Jose, CA (US); Siddharth A. Patwardhan, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/448,014

(22) Filed: Jun. 21, 2019

(65) Prior Publication Data
US 2019/0311037 A1 Oct. 10, 2019

Related U.S. Application Data

(63) Continuation of application No. 15/432,971, filed on Feb. 15, 2017, now Pat. No. 10,452,780.

(51) Int. Cl.
*G06F 17/27* (2006.01)
*G06F 40/30* (2020.01)
(Continued)

(52) U.S. Cl.
CPC .......... *G06F 40/30* (2020.01); *G06F 40/169* (2020.01); *G06Q 50/18* (2013.01)

(58) Field of Classification Search
CPC .... G06F 17/2785; G06F 17/241; G06Q 50/18
(Continued)

(56) References Cited

U.S. PATENT DOCUMENTS 6,856,988 B1  2/2005  Humphrey
7,860,872 B2  12/2010 Serjeantson et al.
(Continued)

FOREIGN PATENT DOCUMENTS

WO     2015044934 A1    4/2015

OTHER PUBLICATIONS

H. Alfraidi, W. Lee and D. Sankoff, "Literature Visualization and Similarity Measurement Based on Citation Relations," 2015 19th International Conference on Information Visualisation, Barcelona, 2015, pp. 217-222, doi: 10.1109/iV.2015.47. (Year: 2015).*
(Continued)

Primary Examiner — Bharatkumar S Shah
(74) Attorney, Agent, or Firm — Aaron N. Pontikos

(57) ABSTRACT

A computer-implemented method includes detecting a first set and a second set of citations to a legal case in a plurality of legal documents and a first legal document distinct from the plurality of legal documents, respectively. The computer-implemented method further includes determining tones corresponding to each citation in the first and second sets of citations. The computer-implemented method further includes determining a score for each tone in the first and second sets of tones. The computer-implemented method further includes aggregating a first and subset and a second of the first and second sets of citations, respectively. The computer-implemented method further includes generating an average score for the first and second subsets. The computer-implemented method further includes determining a degree of similarity between the first and second subsets based, in part, on a comparison of average scores. A corresponding computer program product and computer system are also disclosed.

20 Claims, 5 Drawing Sheets

(51) Int. Cl.
 *G06Q 50/18* (2012.01)
 *G06F 40/169* (2020.01)
(58) Field of Classification Search
 USPC .......................................................... 704/9
 See application file for complete search history.

(56) References Cited

U.S. PATENT DOCUMENTS

| | | | |
|---|---|---|---|
| 7,865,354 | B2 | 1/2011 | Chitrapura et al. |
| 8,166,032 | B2 | 4/2012 | Sommer et al. |
| 8,219,429 | B2 | 7/2012 | Blair et al. |
| 8,725,495 | B2 | 5/2014 | Peng et al. |
| 9,019,769 | B2 | 4/2015 | Lee |
| 9,940,389 | B2 | 4/2018 | Zhang |
| 10,146,864 | B2 | 12/2018 | Kemp |
| 2006/0149720 | A1* | 7/2006 | Dehlinger ............. G06F 16/313 |
| 2013/0297540 | A1 | 11/2013 | Hickok |
| 2013/0311485 | A1 | 11/2013 | Khan |
| 2014/0108006 | A1 | 4/2014 | Vogel et al. |
| 2015/0066953 | A1 | 3/2015 | Krusell |
| 2015/0205781 | A1 | 7/2015 | Feng |
| 2015/0347391 | A1 | 12/2015 | Chen et al. |
| 2016/0071119 | A1 | 3/2016 | Blanchflower et al. |
| 2016/0103835 | A1 | 4/2016 | Zupancic |
| 2016/0163332 | A1 | 6/2016 | Un |
| 2016/0188674 | A1 | 6/2016 | Han |
| 2016/0342591 | A1* | 11/2016 | Zholudev ................ G06F 16/93 |
| 2018/0232358 | A1 | 8/2018 | Badenes et al. |
| 2018/0232826 | A1 | 8/2018 | Badenes et al. |
| 2018/0232827 | A1 | 8/2018 | Badenes et al. |

OTHER PUBLICATIONS

F. Heimerl, Q. Han, S. Koch and T. Ertl, "CiteRivers: Visual Analytics of Citation Patterns," in IEEE Transactions on Visualization and Computer Graphics, vol. 22, No. 1, pp. 190-199, Jan. 31, 2016, doi: 10.1109/TVCG.2015.2467621. (Year: 2016).*

A. M. Khan, A. Shahid, M. T. Afzal, F. Nazar, F. S. Alotaibi and K. H. Alyoubi, "SwICS: Section-Wise In-Text Citation Score," in IEEE Access, vol. 7, pp. 137090-137102, 2019, doi: 10.1109/ACCESS.2019.2942322. (Year: 2019).*

"AlchemyLanguage", IBM Watson Developer Cloud, 2 pages, printed on Sep. 10, 2016, <https://alchemy-language-demo.mybluemix.net/>.

"Case Law Research", Queen's University Library, 8 pages, printed on Sep. 10, 2016, <http://library.queensu.ca/law/lederman/caselawresearch>.

"KeyCite Status Flags", 1 page, printed on Sep. 10, 2016, © 2002-2010 Thomson Reuters, <http://www2.westlaw.com/CustomerSupport/Knowledgebase/Technical/WestlawCreditCard/WebHelp/KeyCite_Status_Flags.htm>.

"Sentiment Classification based on Judge's overlap with corpus", An IP.com Prior Art Database Technical Disclosure, Authors et. al.: Disclosed Anonymously, IP.com No. IPCOM000245765D, IP.com Electronic Publication Date: Apr. 6, 2016, 4 pages.

Tone Analyzer, IBM Watson Developer Cloud, 3 pages, printed on Sep. 10, 2016, <http://www.ibm.com/watson/developercloud/tone-analyzer.html.

Babour et al., "Tweet Sentiment Analytics With Context Sensitive Tone-Word Lexicon", 2014 IEEE/WIC/ACM International Joint Conferences on Web Intelligence (WI) and Intelligent Agent Technologies (IAT), pp. 392-399, DOI 10.1109/WI-IAT.2014.61, © 2014 IEEE.

Badenes et al., "Annotation of Legal Documents With Case Citations", U.S. Appl. No. 15/432,982, filed Feb. 15, 2017, pp. 1-37.

Evans et al., "The Effect of Style and Topography on Perceptions of Document Tone", pp. 300-303, 9-7803-8467-9/04, © 2004 IEEE.

IBM Appendix P., "List of IBM Patents or Patent Applications to be Treated as Related", Dated Herewith, 2 pages.

* cited by examiner

TONE ANALYSIS OF LEGAL DOCUMENTS

BACKGROUND

The present invention relates generally to the field of sentiment analysis, and more particularly to analyzing the tone of legal documents.

An Opinion of the Court (i.e., "court opinion," "judicial opinion," "legal opinion") is a court's official decision in a case. The opinion is a decision written by one or more justices that details the legal principles and rationales that the one or more justices relied upon to reach their decision. The court opinion includes various parts, including the heading information, the prior history, the summary of the facts, and the opinion (i.e., decision from the court which constitutes the law). Oftentimes, the court opinion includes multiple opinions reflecting the different rationales that the justices used to reach their decision. If more than half of the justices agree, than a majority opinion is issued. If some justices agree with the majority opinion, but base their decision on a different rationale, one or more concurring opinions are issued in addition to the majority opinion. Similarly, if some justices disagree with the majority opinion, one or more dissenting opinions are issued.

SUMMARY

A computer-implemented method includes detecting a first set of citations to a legal case cited in a plurality of legal documents. The computer-implemented method further includes determining a first set of tones corresponding to each citation in the first set of citations. The computer-implemented method further includes determining a first score for each tone in the first set of tones. The computer-implemented method further includes aggregating a first subset of the first set of citations, wherein each citation in the first subset shares at least a first tone. The computer-implemented method further includes generating a first average score for the first subset. The computer-implemented method further includes detecting a second set of citations to the legal case cited in a first legal document, wherein the first legal document is not in the plurality of legal documents. The computer-implemented method further includes determining a second set of tones corresponding to each citation in the second set of citations. The computer-implemented method further includes determining a second score for each tone in the second set of tones. The computer-implemented method further includes aggregating a second subset of the second set of citations, wherein each citation in the second subset shares at least the first tone. The computer-implemented method further includes generating a second average score for the second subset. The computer-implemented method further includes determining a first degree of similarity between the first subset and the second subset based, at least in part, on a comparison of the first average score and the second average score. A corresponding computer program product and computer system are also disclosed.

DETAILED DESCRIPTION

Figure 1:
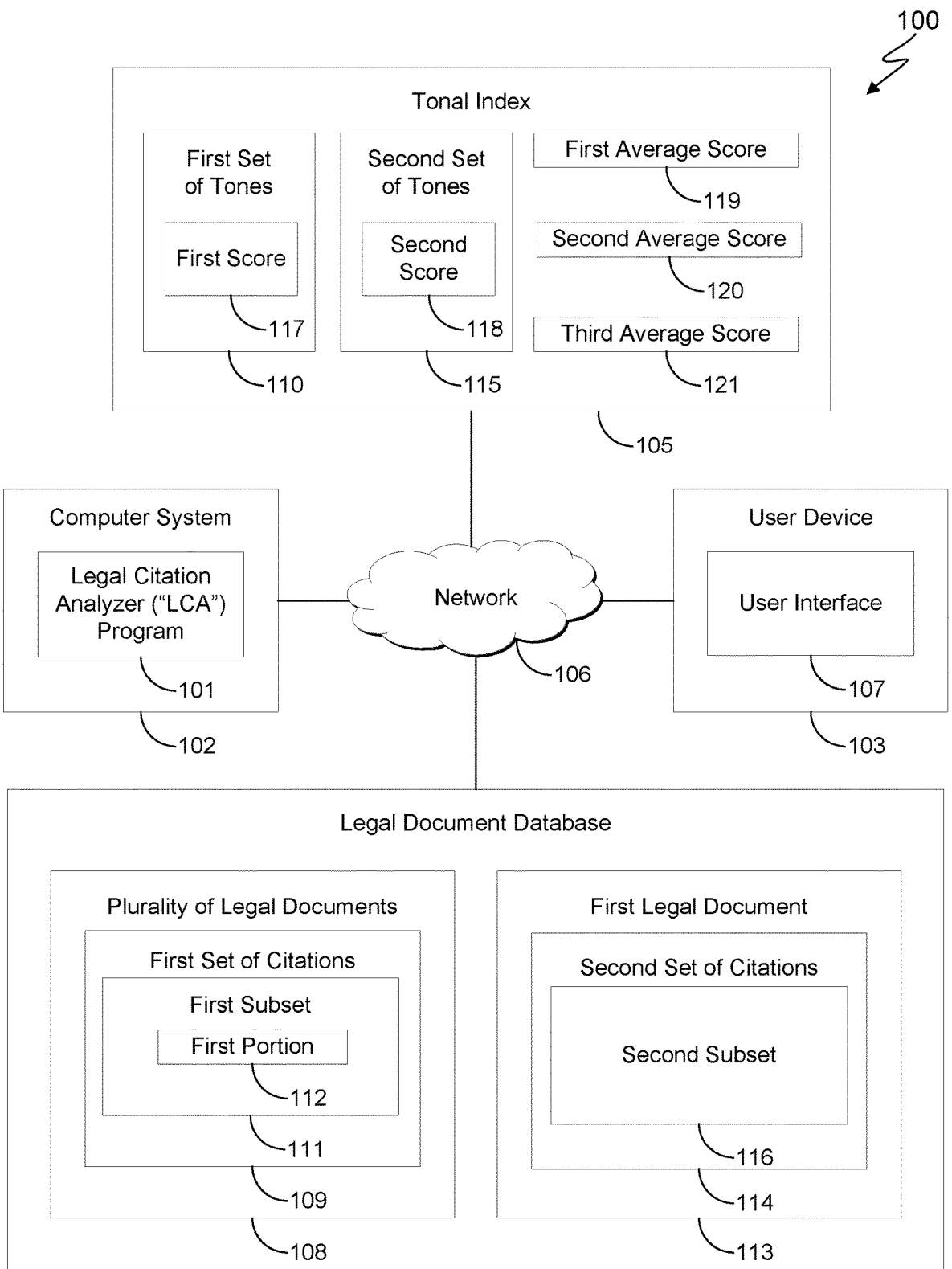
FIG. 1 is a functional block diagram of a computing environment, generally designated 100, suitable for operation of a legal citation analyzer program, in accordance with at least one embodiment of the invention.

In countries that use a common law system, such as the United States, a majority opinion in a court opinion becomes part of the body of case law. Accordingly, the case law can be cited as precedent by later courts when issuing their own decisions. Similarly, the case law can be cited as precedent in an attorney's legal brief or memorandum of law to direct the court on how to rule in a case. On the other hand, a dissenting opinion does not create binding precedent, nor does it become a part of the case law. However, a dissenting opinion can be cited as persuasive authority when a justice wants to argue that the court's holding (i.e., determining of a matter of law based on the issue presented in a particular case) should be limited or overturned. Similarly, a dissenting opinion can be cited in an attorney's legal brief or memorandum of law in an attempt to persuade the court to limit or overturn current case law.

The body of case law and dissenting opinions are paramount in an attorney's ability to dictate how a court should rule in a case. In order to assist attorneys in their legal research, existing technologies, such as LexisNexis® and Westlaw®, hire and train attorneys to analyze the content of court opinions. These "attorney-editors" determine whether a citation to a legal case in a court opinion has received positive, negative, cautionary or neutral treatment by physically parsing through the court opinion. Embodiments of the present invention recognize that hundreds or thousands of court opinions are published daily and that physically parsing through each court opinion is both inefficient and time consuming.

Once an attorney-editor determines the treatment of a legal case cited in a court opinion, a "citation signal" or "status flag" can be placed next to the case name to indicate the current treatment of the case. For example, a red flag may indicate that the case has negative history (e.g., judicial review was allowed, reconsideration was allowed, the case was reversed or quashed) or negative treatments (e.g., the case was not followed or was questioned by a subsequent court). In another example, a green flag may indicate that the case has positive history (e.g., the case was affirmed, judicial review was denied, or leave to appeal was refused by a higher court) or positive treatments (e.g., the case is followed or followed in a minority opinion of a subsequent court). In yet another example, a yellow flag may indicate that the case has some negative history or has been distinguished by a subsequent court but has not been reversed or overruled. Similarly, another symbol may be used to indicate that a case has neutral history (e.g., the case is abandoned, abated, a leave to appeal was granted, reconsideration was denied), or that a case has neutral treatments (e.g., the case was mentioned, explained, cited, or cited in a dissenting opinion). Of the different symbol indicators that can be assigned to a legal case, a majority of the signals fall under the "cautionary" or "neutral" heading. However, a cautionary or neutral signal is not very useful in that the reason why a case is associated with a cautionary or neutral signal is often ambiguous.

Embodiments of the present invention recognize that the process of associating a signal with a legal case can be improved by further refining these signals based on mapping a tone to a legal case each time the case is cited in a court opinion. Embodiments of the present invention recognize that the process of associating a signal with a legal case can be improved by breaking down a cited case by emotion, style of language, and social tendencies. Embodiments of the present invention recognize that the process of associating a signal with a case can be improved by providing signals that correspond to an individual justice's tone regarding a particular legal case. Embodiments of the present invention recognize that the process of associating a signal with a case can be improved by providing signals that correspond to an average tone of all of the justices who have cited to a particular legal case. Various embodiments of the present invention may address or improve upon some or all of the aforementioned problems or disadvantages, however it will be understood that addressing any particular problem or disadvantage is not a necessary requirement for the practice of all embodiments of the present invention.

Referring now to various embodiments of the invention in more detail, FIG. 1 is a functional block diagram of a computing environment, generally designated 100, suitable for operation of a legal citation analyzer ("LCA") program in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes computer system 102, user device 103, legal document database 104, and tonal index 105 interconnected over network 106. Network 106 can be, for example, a telecommunications network, a local area network (LAN), a wide area network (WAN), such as the Internet, or a combination of the three, and can include wired, wireless, or fiber optic connections. Network 106 may include one or more wired and/or wireless networks that are capable of receiving and transmitting data, voice, and/or video signals, including multimedia signals that include voice, data, and video information. In general, network 106 may be any combination of connections and protocols that will support communications between computer system 102, user device 103, legal document database 104, tonal index 105, and other computing devices (not shown) within computing environment 100.

User device 103 can be a laptop computer, tablet computer, smartphone, smartwatch, or any programmable electronic device capable of communicating with various components and devices within computing environment 100, via network 106. In general, user device 103 represents any programmable electronic device or combination of programmable electronic devices capable of executing machine readable program instructions and communicating with other computing devices (not shown) within computing environment 100 via a network, such as network 106. User device 103 includes user interface 107.

User interface 107 provides an interface between a user of user device 103 and computer system 102. In one embodiment, user interface 107 is a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 107 is mobile application software that provides an interface between a user of user device 103 and computer system 102. Mobile application software, or an "app," is a computer program that runs on smartphones, tablet computers, smartwatches and any other mobile devices.

Legal document database 104 includes a plurality of legal documents 108. In some embodiments, plurality of legal documents 108 includes court opinions and law journal articles. In embodiments of the invention, LCA program 101 detects a first set of citations 109 cited to in plurality of legal documents 108. In embodiments of the invention, LCA program 101 determines a first set of tones 110 corresponding to each citation in first set of citations 109. In embodiments of the invention, LCA program 101 aggregates a first subset 111 of first set of citations 109. Each citation in first subset 111 shares at least one tone in common. In some embodiments, LCA program 101 aggregates a first portion 112 of first subset 111. In some embodiments, each citation in first portion 112 of first subset 111 corresponds to at least a first justice (i.e., "judge," "magistrate," etc.).

In embodiments of the invention, legal document database 104 includes a first legal document 113. First legal document 113 is distinct from plurality of legal documents 108. In some embodiments, first legal document 113 may be a case brief, memorandum of law, motion, and/or any other legal document written by a lawyer. In embodiments of the invention, LCA program 101 detects a second set of citations 114 cited to in first legal document 113. In embodiments of the invention, LCA program 101 determines a second set of tones 115 corresponding to each citation in second set of citations 114. In embodiments of the invention, LCA program 101 aggregates a second subset 116 of second set of citations 114. Each citation in second subset 116 shares at least one tone in common. In some embodiments, each citation in first subset 111 and each citation in second subset 116 shares at least one tone in common.

Tonal index 105 stores first set of tones 110 corresponding to each citation in first set of citations 109 and second set of tones 115 corresponding to each citation in second set of citations 114. In embodiments of the invention, tonal index 105 stores a first score 117 for each tone in first set of tones 110 and a second score 118 for each tone in second set of tones 115. In embodiments of the invention, tonal index 105 stores a first average score 119 for first subset 111 and a second average score 120 for second subset 116. In some embodiments, tonal index 105 stores a third average score 121 for first portion 112 of first subset 111. In some embodiments, tonal index 105 is a local index. In other embodiments, tonal index 105 is a global index.

Computer system 102 can be a standalone computing device, a management server, a web server, a mobile computing device, or any other electronic device or computing system capable of receiving, sending, and processing data. In other embodiments, computer system 102 can represent a server computing system utilizing multiple computers as a server system, such as in a cloud computing environment. In an embodiment, computer system 102 represents a computing system utilizing clustered computers and components (e.g., database server computers, application server computers, etc.) that act as a single pool of seamless resources when accessed within computing environment 100. Computer system 102 includes LCA program 101, communicatively coupled to computer system 102. Computer system 102 includes internal and external hardware components, as depicted and described in further detail with respect to FIG. 5.

Figure 2:
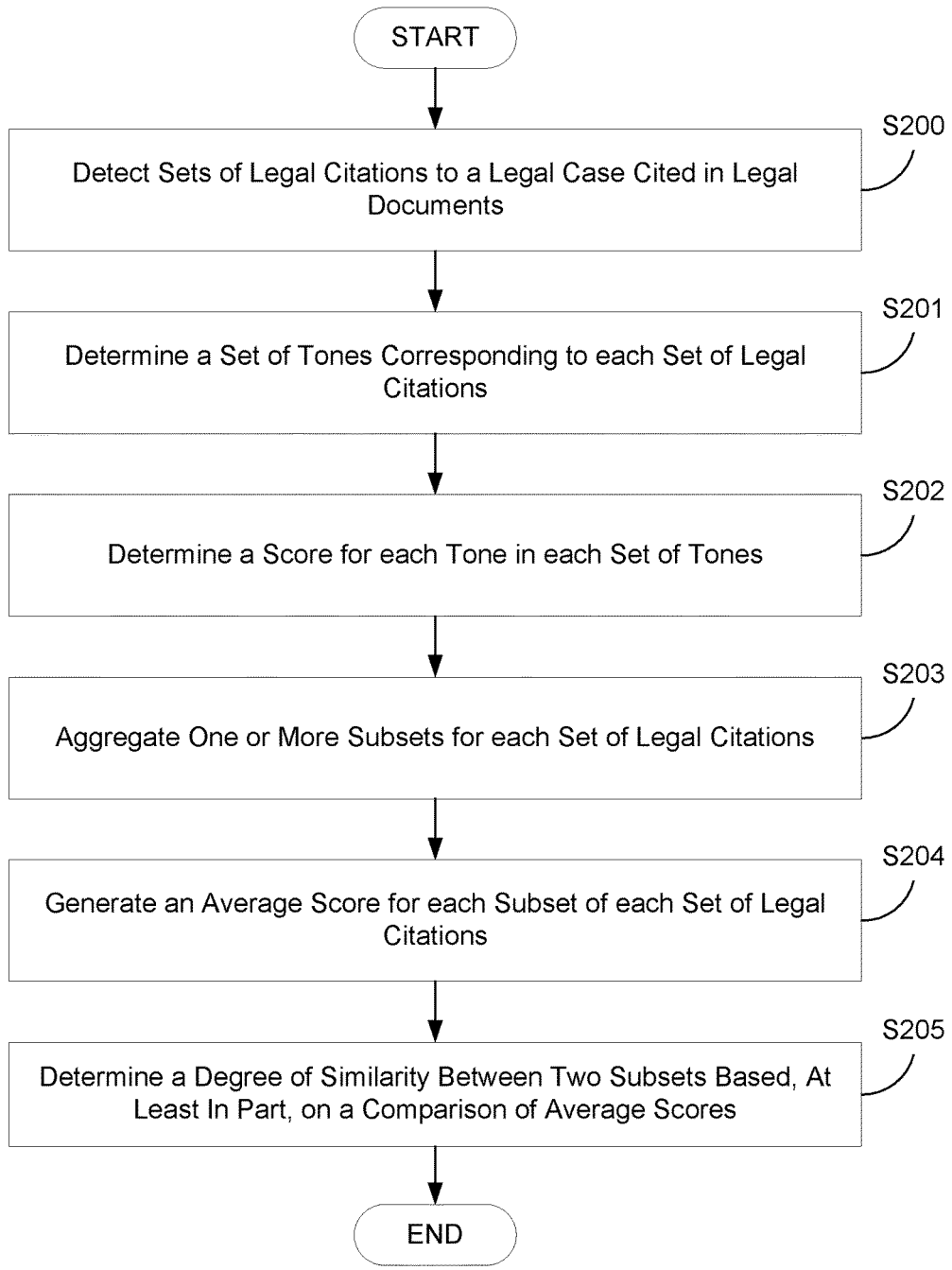
FIG. 2 is a flow chart diagram depicting operational steps for a legal citation analyzer program, in accordance with at least one embodiment of the invention.

FIG. 2 is a flow chart diagram depicting operational steps for an LCA program in accordance with at least one embodiment of the present invention. At step S200, LCA program 101 detects sets of legal citations to a common legal case cited in legal documents. In embodiments of the invention, LCA program 101 detects first set of citations 109 to a legal case (e.g., Jim v. Jones) cited in plurality of legal documents 108. In embodiments of the invention, LCA program 101 detects second set of citations 114 to the same legal case (e.g., Jim v. Jones) cited in first legal document 113, wherein first legal document 113 is not in plurality of legal documents 108. In alternative embodiments of the invention, LCA program 101 detects a name of at least a first justice corresponding to first set of citations 109. For example, LCA program 101 detects the name of a justice (e.g., Justice Blue) who cited to the legal case Jim v. Jones in a majority opinion, concurring opinion, and/or dissenting opinion of a court opinion.

In some embodiments, LCA program 101 detects sets of citations to a common legal case and/or the name of at least a first justice through the use of natural language processing ("NLP") software. One example of NLP software is Watson® Alchemy Language. For example, LCA program 101 utilizes NLP software to detect and extract a citation to Jim v. Jones from a PDF file of a court opinion. In another example, LCA program 101 utilizes NLP software to detect and extract a citation to the legal case Jim v. Jones from a text file of a lawyer's case brief. In another example, LCA program 101 utilizes NLP software to detect and extract a name of a justice citing to Jim v. Jones in a majority opinion (e.g., "Blue, Justice, delivered the opinion of the Court"). LCA program 101 may repeat step S200 and detect a set of citations for any number of additional legal cases cited in plurality of legal documents 108. Similarly, LCA program 101 may repeat step S200 and detect a set of citations for any number of additional legal cases cited in first legal document 113.

At step S201, LCA program 101 determines a set of tones corresponding to each set of legal citations. In embodiments of the invention, LCA program 101 determines first set of tones 110 corresponding to each citation in first set of citations 109. In embodiments of the invention, LCA program 101 determines second set of tones 115 corresponding to each citation in second set of citations 114. For example, LCA program 101 detects citations to the legal cases Adams (Adams, 82 New Delaware St.7d at 259, 357 N.E.3d at 79) and Burns (Burns, 54 New Island St. 3d at 349, 573 N.E.5d at 43) cited in the following portion of an Opinion of the Court written in the majority decision in the case Patent v. Infringement:

> In spite of these observations, however, a majority of this court expressly eschewed the Adams approach in Burns. Though the New Delaware Court determined that still another safeguard for infringement of computer software was unnecessary, Adams, 82 New Delaware St.7d at 259, 357 N.E.3d at 79, this court decided that the New Delaware Constitution requires a different analytical focus—a categorical determination of whether, under the totality of the circumstances, a defendant may be liable for inducing infringement of a patent under 53 U.S.C. § 123(a) when no one has directly infringed the patent under § 123(b) or any other statutory provision. Burns, 54 New Island St. 3d at 349, 573 N.E.5d at 43.

Based on the text prior to and/or subsequent to the citation to Adams, LCA program 101 determines a tone of "opposition." Similarly, based on the text prior to and/or subsequent to the citation to Burns, LCA program 101 determines a tone of "approval."

In some embodiments, LCA program 101 determines one or more tones in first set of tones 110 and second set of tones 115 from a predefined corpus of sentimental tones. For example, LCA program 101 determines tones of frustration, outrage, protest, and piqued for the sentiment "anger." In another example, LCA program 101 determines tones of disappointment and disapproval for the sentiment "sadness." In another example, LCA program 101 determines tones of approval, compassion, support, and esteem for the sentiment "joy." In another example, LCA program 101 determines tones of dislike, objection, opposition, rejection, dissatisfaction, and dispute for the sentiment "disgust." In another example, LCA program 101 determines tones of concern, unease, doubt, and dismay for the sentiment "fear."

In some embodiments, LCA program 101 determines one or more tones from a predefined corpus of tonal languages. For example, LCA program 101 determines liberal, moderate, and conservative political connotations and/or rhetorical connotations. LCA program 101 may repeat step S201 and determine a set of tones corresponding to a set of citations for any number of additional legal cases cited in plurality of legal documents 108. Similarly, LCA program 101 may repeat step S201 and determine a set of tones corresponding to a set of citations for any number of additional legal cases cited in first legal document 113.

In embodiments of the invention, LCA program 101 determines one or more tones in first set of tones 110 and second set of tones 115 through the use of sentiment analysis (i.e., opinion mining) software. Sentiment analysis aims to determine the attitude of an individual or group with respect to a particular topic. More specifically, sentiment analysis refers to the use of NLP software, text analysis software, and computational linguistics software to identify and extract subjective information in source materials. For example, attitude may be associated with a justice's judgment, reasoning, or evaluation with respect to a citation to the legal case Jim v. Jones in a court opinion. In another example, attitude may be associated with a justice's affective state (i.e., emotional state or tone) with respect to a citation to the legal case Jim v. Jones in a court opinion. In another example, attitude may be associated with a justice's style of language, political principles (e.g., liberal, moderate, and conservative), or rhetorical connotations (e.g., liberal, neutral, and conservative) with respect to a citation to the legal case Jim v. Jones in a court opinion.

In some embodiments, LCA program 101 determines one or more tones in first set of tones 117 and second set of tones 118 through the use of an analytics engines. One example of an analytics engine is IBM® Watson Tone Analyzer. For example, LCA program 101 detects a citation to Jim v. Jones in a court opinion. Based on the text prior to and/or subsequent to the citation to Jim v. Jones, LCA program 101 utilizes an analytics engine to determine tones of "rejection" and "dissatisfaction." In some embodiments, LCA program 101 employs NLP and text analysis (i.e., deriving high-quality information from text through the devising of patterns and trends through means such as statistical pattern learning) to determine subjective information about first set of citations 109 and second set of citations 114. For example, LCA program 101 receives a case brief and identifies a citation to the legal case Jim v. Jones. Based on text prior to and/or subsequent to the citation to Jim v. Jones, LCA program 101 utilizes NLP and text analysis to determine tones of "approval" and "esteem."

At step S202, LCA program 101 determines a score for each tone in each set of tones. In embodiments of the invention, LCA program 101 determines first score 117 for each tone in first set of tones 110 and second score 118 for each tone in second set of tones 115. In some embodiments, first score 117 and second score 118 are determined based, at least in part, on a level of intensity of each tone corresponding to a citation. In some embodiments, a level of intensity is determined by the words and/or the context of words prior to and after a citation. In some embodiments, LCA program 101 determines first score 117 and second score 118 for each tone of a corpus of tones, regardless of whether or not a tone corresponds to a citation. For example, a corpus of tones may include the following tones: "frustration," "protest," "disapproval," "approval," "support," and "doubt." LCA program 101 may determine tones of "frustration" and "objection" with respect to a citation to the legal case Jim v. Jones in a court opinion. Here, LCA program 101 may assign scores of 0.8 for the tone "frustration" and 0.3 for the tone "objection" based on the words and/or the context of words prior to and after the citation to Jim v. Jones. Similarly, LCA program 101 may assign a score of 0.0 for the remaining tones of the corpus of tones that do not correspond to a citation to the legal case Jim v. Jones in the court opinion. In an embodiment, each score is a numerical fraction (e.g., 0.0 to 1.0). In an embodiment, each score is a numerical whole number (e.g., one through ten). In an embodiment, each score is a range (e.g., low, medium, or high). In other embodiments, the scores may be represented by any generally known means of ranking each tone in first set of tones 110 and second set of tones 115.

At step S203, LCA program 101 aggregates one or more subsets for each set of legal citations. Each citation in a subset of a set of citations shares at least a first common tone (e.g., "frustration"). In some embodiments, each citation in a subset of a set of citations shares at least two or more common tones (e.g., "frustration" and "rejection"). In embodiments of the invention, LCA program 101 aggregates first subset 111 of first set of citations 109 and second subset 116 of second set of citations 114. For example, LCA program 101 detects 500 citations to Jim v. Jones in first set of citations 109. Accordingly, LCA program 101 determines first set of tones 110 corresponding to each of the 500 citations to Jim v. Jones in first set of citations 109. In this example, assume that first set of tones 110 includes 200 citations corresponding to the tone "frustration," 15 citations corresponding to the tone "approval," 20 citations corresponding to the tone "support," 150 citations corresponding to the tone "rejection," and 115 citations corresponding to the tone "concerned." Here, LCA program 101 aggregates first subset 111 of first set of citations 109, wherein each citation to Jim v. Jones in first subset 111 shares at least a first common tone (e.g., "frustration"). LCA program 101 may aggregate additional subsets of sets of citations for each type of tone corresponding to a set of citations.

In some embodiments, LCA program 101 aggregates first portion 112 of first subset 111. First portion 112 includes a portion of citations cited to by at least a first justice and sharing at least a first common tone. Continuing with the previous example, assume that LCA program 101 detected that Justice Blue cited to Jim v. Jones in 15 citations of the 200 citations of first subset 111 of first set of citations 109. Accordingly, first portion 112 of first subset 111 includes 15 citations to Jim v. Jones by Justice Blue, wherein each citation in first portion 112 shares at least the tone "frustration."

At step S204, LCA program 101 generates an average score for each subset of each set of legal citations. In embodiments of the invention, LCA program 101 generates first average score 119 for first subset 111 of first set of citations 109 and second average score 120 for second subset 116 of second set of citations 114. In the previous example, LCA program 101 aggregated first subset 111 of first set of citations 109 to Jim v. Jones, wherein first subset 111 included 200 citations corresponding to the tone "frustration." Based on first score 117 determined for each citation corresponding to the tone "frustration" in first subset 111, LCA program 101 may generate first average score 119 (e.g., 0.7). Similarly, LCA program 101 may generate an average score for any additional subsets of a set of citations, wherein each additional subset shares a common tone of "approval," "support," "rejection," and "concerned," respectively. Based on each additional subset, LCA program 101 may generate first average score 119 (e.g., 0.3) for the tone "approval," first average score 119 (e.g., 0.1) for the tone "support," first average score 119 (e.g., 0.9) for the tone "rejection," and first average score 119 (e.g., 0.5) for the tone "concerned." In some embodiments, LCA program 101 generates an average score of 0 for any tones in a corpus of tones that are not represented in a subset.

In some embodiments, LCA program 101 generates third average score 121 for first portion 112 of first subset 111 of first set of citations 109. Continuing with the previous example, first portion 112 of first subset 111 included 15 citations to Jim v. Jones by Justice Blue, wherein each citation in first portion 112 shares at least the tone "frustration." Based on second score 118 determined for each citation corresponding to the tone "frustration" in first portion 112, LCA program 101 may generate third average score 121 (e.g., 0.9). LCA program 101 may generate an average score for a portion of any additional subsets of a set of citations. In some embodiments, LCA program 101 generates third average score 121 of 0 for any tones in a corpus of tones that are not represented in a first portion of a first subset.

At step S205, LCA program 101 determines a degree of similarity between two subsets based, at least in part, on a comparison of average scores. The degree of similarity between two subsets is further based on each subset sharing at least a first common tone. In embodiments of the invention, LCA program 101 determines a degree of similarity between first average score 119 for first subset 111 of first set of citations 109 and second average score 120 for second subset 116 of second set of citations 114. In some embodiments, LCA program 101 determines a degree of similarity between second average score 120 for second subset 116 of second set of citations 114 and third average score 121 for first portion 112 of first subset 111 of first set of citations 109. For example, LCA program 101 may generate first average score 119 of 0.9 for first subset 111 of first set of citations 109, wherein each citation in first subset 111 corresponds to the tone "rejection." Similarly, LCA program 101 may generate second average score 120 of 0.4 for second subset 116 of second set of citations 114, wherein each citation in second subset 116 also corresponds to the tone "rejection." Here, LCA program 101 determines a degree of similarity of 44 percent (0.4/0.9). In some embodiments, LCA program 101 flags a citation in first legal document 113 if the degree of similarity is below a given threshold (e.g., 75 percent). In some embodiments, LCA program 101 flags a citation in first legal document 113 is the degree of similarity is above a given threshold (e.g., 90 percent).

In some embodiments, the comparison of the average scores is based on calculating a standard deviation of scores. For example, LCA program 101 generates first average score 119 of 0.7 for first subset 111 (e.g., tone of "support") corresponding to first set of citations 109 (e.g., Jim v. Jones) cited in a plurality of court opinions. Similarly, LCA program 101 generates second average score 120 of 0.6 for second subset 116 (e.g., tone of "support") corresponding to second set of citations 114 (e.g., Jim v. Jones) cited in a lawyer's case brief. Based on a calculated standard deviation of scores, LCA program 101 determines whether the average strength of the lawyer's tone of "support" (i.e., average score of 0.6) corresponding to the citation to Jim v. Jones in the case brief is similar (i.e., within one standard deviation) to the average strength of the tone of "support" (i.e., average score of 0.7) in the plurality of court opinions. In some embodiments, LCA program 101 flags a citation in first legal document 113 if the degree of similarity is above a given threshold (e.g., more than one standard deviation).

In some embodiments, LCA program 101 generates at least a first suggested legal document (e.g., a court opinion) in first plurality of legal documents 108. In some embodiments, the at least first suggested legal document is generated based on identifying a tone corresponding to a citation in first subset 111 and identifying the same tone corresponding to the same citation in second subset 116. In some embodiments, the at least first suggested legal document is generated based on identifying a tone having a score that corresponds to a citation in first subset 111 and identifying the same score for the same tone that corresponds to same citation in second subset. For example, LCA program 101 suggests a first suggested legal document in first plurality of legal documents 108 based on identifying a citation to Jim v. Jones cited in the second legal document (e.g., court opinion) that has a tone (e.g., tone of "support") whose first score 119 (e.g., 0.8) matches the second score 120 (e.g., 0.8) of the tone of "support" corresponding to the citation to Jim v. Jones cited in the first legal document (e.g., a lawyer's memorandum of law). In other words, LCA program 101 suggests a legal document (e.g., court opinion) that contains a citation to a legal case whose tone and score matches the tone and score of the words prior and/or or subsequent to the same legal case cited in a lawyer's legal document (e.g., case brief).

In some embodiments, LCA program 101 generates at least a first suggested legal document if a citation in first legal document is flagged. In some embodiments, LCA program 101 generates at least a first suggested legal document if a degree of similarity between first average score 119 for first subset 111 of first set of citations 109 and second average score 120 for second subset 116 is below a given threshold. In some embodiments, LCA program 101 generates at least a first suggested legal document if a degree of similarity between first average score 119 for first subset 111 of first set of citations 109 and second average score 120 for second subset 116 is above a given threshold. In some embodiments, LCA program 101 automatically replaces a citation to a legal case cited in first legal document with a citation to a legal case cited in a first suggested legal document (e.g., court opinion) in plurality of legal documents 108.

In some embodiments, LCA program 101 generates at least a second suggested legal document (e.g., a court opinion) in first plurality of legal documents 108. In some embodiments, the at least second suggested legal document is generated based on identifying a tone corresponding to a citation in second subset 116 and identifying the same tone corresponding to the same citation in first portion 112 of first subset 111. In some embodiments, the at least first suggested legal document is generated based on identifying a tone having a score that corresponds to a citation in first subset 111 and identifying the same score for the same tone that corresponds to same citation in second subset. For example, LCA program 101 suggests a second suggested legal document based identifying Justice Brown's citation to Jim v. Jones in a legal document (e.g., court opinion) having a corresponding tone of "rejection" whose first score 119 (e.g., 0.7) matches the second score 120 (e.g., 0.7) of the tone of "rejection" corresponding to the citation to Jim v. Jones cited in a lawyer's case brief. In other words, LCA program 101 may identify a legal document (e.g., court opinion) that contains a citation to a legal case by a particular justice whose tone and score matches the tone and score of the words prior to and/or or subsequent to the same legal case cited in a lawyer's legal document (e.g., memorandum of law).

Figure 3:
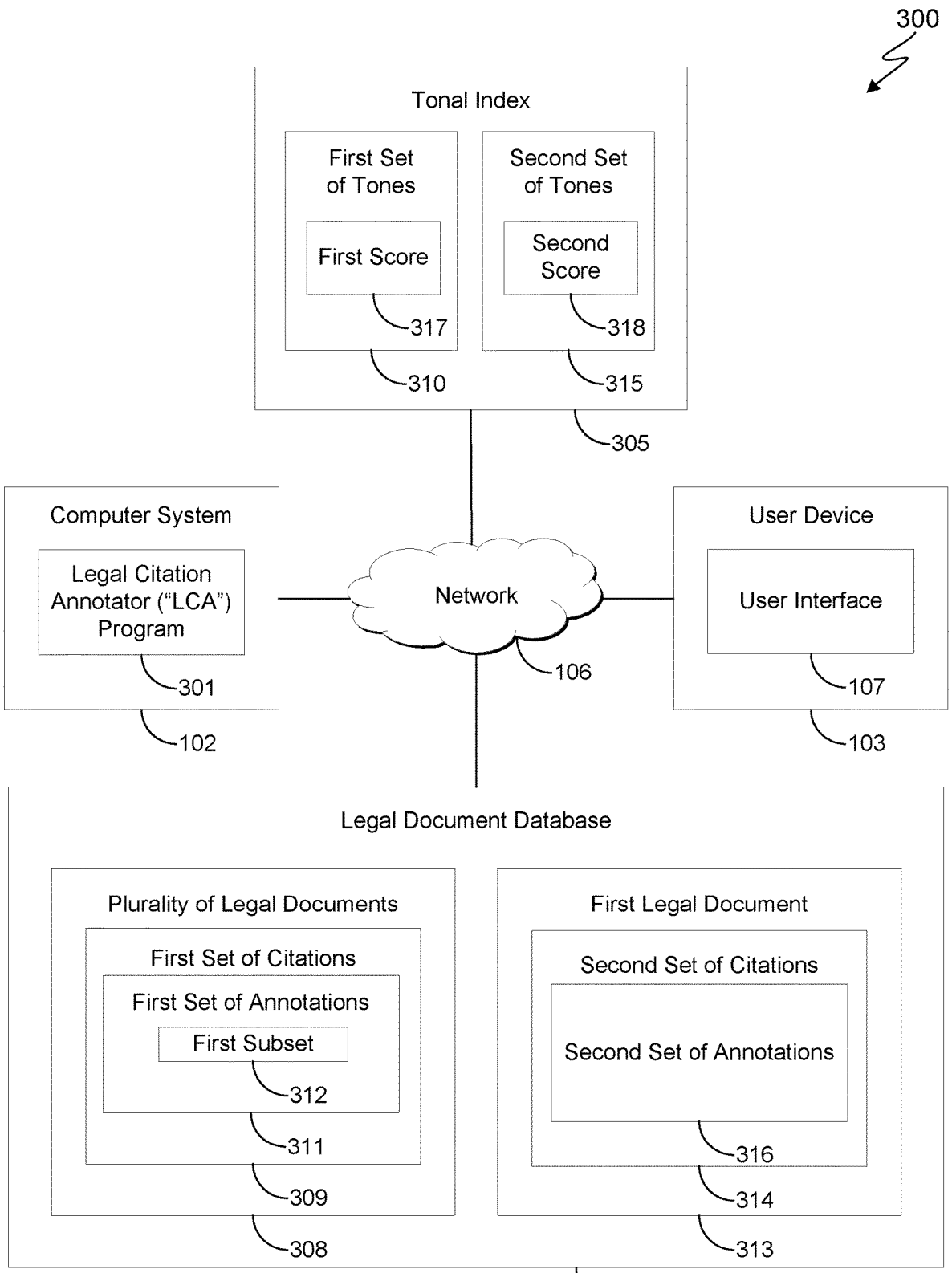
FIG. 3 is a functional block diagram of a computing environment, generally designated 300, suitable for operation of a legal citation annotator program, in accordance with at least one embodiment of the invention.

FIG. 3 is a functional block diagram of a computing environment, generally designated 300, suitable for operation of a legal citation annotation ("LCA") program, in accordance with at least one embodiment of the invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 300 includes computer system 102, user device 103, legal document database 304, and tonal index 305 interconnected over network 106. Computer system 102 includes LCA program 301, communicatively coupled to computer system 102. Computer system 102 includes internal and external hardware components, as depicted and described in further detail with respect to FIG. 5.

Legal document database 304 includes a plurality of legal documents 308. In some embodiments, plurality of legal documents 308 includes court opinions. In some embodiments, plurality of legal documents 308 includes law journal articles. In embodiments of the invention, LCA program 301 detects a first set of citations 309 cited to in plurality of legal documents 308. In embodiments of the invention, LCA program 301 determines a first set of tones 310 corresponding to each citation in first set of citations 309. In embodiments of the invention, LCA program 301 detects a first set of annotations 311 corresponding to each citation in first set of citations 309. In embodiments of the invention, LCA program 301 aggregates a first subset 312 of first set of annotations 311. Each annotation in first subset 312 shares a common annotation. In embodiments of the invention, an annotation may be any generally known means of indicating or displaying a case treatment corresponding to a legal citation.

In embodiments of the invention, legal document database 304 includes first legal document 313. First legal document 313 is distinct from plurality of legal documents 308. In some embodiments, first legal document 313 is a court opinion. In some embodiments, first legal document 313 is a law journal article. In embodiments of the invention, LCA program 301 detects a second set of citations 314 cited to in first legal document 313. In embodiments of the invention, LCA program 301 determines a second set of tones 315 corresponding to each citation in second set of citations 314. In embodiments of the invention, LCA program 301 generates second set of annotations 316 based on second set of tones 315 corresponding to each citation in second set of citations 314. In embodiments of the invention, second set of annotations 316 includes a plurality of annotations corresponding to each citation in second set of citations 314 cited in first legal document 313.

Tonal index 305 stores first set of tones 310 corresponding to each citation in first set of citations 309 and second set of tones 315 corresponding to each citation in second set of citations 314. In embodiments of the invention, tonal index 305 stores a first score 317 for each tone in first set of tones 310 and a second score 318 for each tone in second set of tones 315. In some embodiments, tonal index 305 is a local index. In other embodiments, tonal index 305 is a global index.

Figure 4:
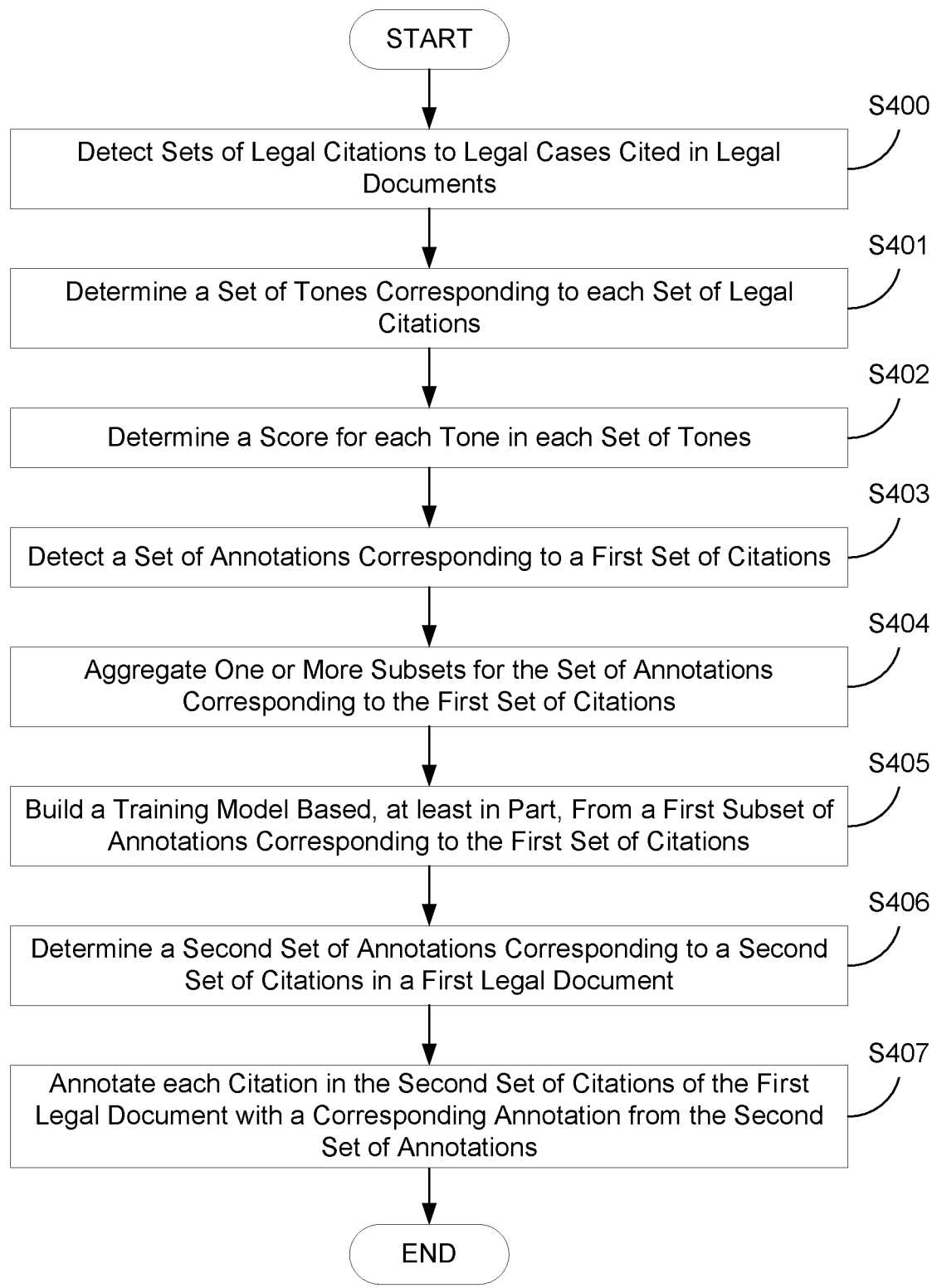
FIG. 4 is a flow chart diagram depicting operational steps for a legal citation annotator program, in accordance with at least one embodiment of the invention.

FIG. 4 is a flow chart diagram depicting operational steps for a legal citation annotator ("LCA") program 301 in accordance with at least one embodiment of the present invention. At step S400, LCA program 301 detects sets of legal citations to a plurality of legal cases cited in legal documents. In embodiments of the invention, LCA program 301 detects first set of citations 309 cited in plurality of legal documents 308. In embodiments of the invention, LCA program 301 detects second set of citations 314 cited in first legal document 313, wherein first legal document 313 is not part of plurality of legal documents 308. In embodiments of the invention, plurality of legal documents 308 are annotated court opinions and/or law review articles. In some embodiments, first legal document 313 is a court opinion that has yet to be annotated (i.e., first legal document 313 is devoid of any case treatments). In some embodiments, first legal document 313 is a law review article that has yet to be annotated. In some embodiments, LCA program 301 detects sets of citations through the use of NLP software. In some embodiments, LCA program 301 detects sets of citations through the use of Watson® Alchemy Language.

At step 401, LCA program 301 determines a set of tones corresponding to each set of legal citations. In embodiments of the invention, LCA program 301 determines sets of tones in accordance with the methods employed by LCA program 101. In embodiments of the invention, LCA program 301 determines first set of tones 310 corresponding to each citation in first set of citations 309. In embodiments of the invention, LCA program 301 determines second set of tones 315 corresponding to each citation in second set of citations 314. In some embodiments, LCA program 301 determines one or more tones in first set of tones 310 and second set of tones 315 from a predefined corpus of sentimental tones. For example, LCA program 301 may determine tones of frustration, outrage, protest, and piqued for the sentiment "anger." In another example, LCA program 301 may determine tones of disappointment and disapproval for the sentiment "sadness." In another example, LCA program 301 may determine tones of approval, compassion, support, and esteem for the sentiment "joy." In another example, LCA program 301 may determine tones of dislike, objection, opposition, rejection, dissatisfaction, and dispute for the sentiment "disgust." In another example, LCA program 301 may determine tones of concern, unease, doubt, and dismay for the sentiment "fear."

In embodiments of the invention, LCA program 301 determines one or more tones in first set of tones 310 and second set of tones 315 through the use of sentiment analysis (i.e., opinion mining) software (e.g., NLP software, text analysis software, and computational linguistics). In some embodiments, LCA program 301 determines one or more tones in first set of tones 310 and second set of tones 315 through the use of an analytics engines, such as IBM® Watson Tone Analyzer. In some embodiments, LCA program 301 employs NLP and text analysis (i.e., deriving high-quality information from text through the devising of patterns and trends through means such as statistical pattern learning) to determine subjective information about first set of citations 309 and second set of citations 314.

At step S402, LCA program 301 determines a score for each tone in each set of tones. In embodiments of the invention, LCA program 301 determines first score 317 for each tone in first set of tones 310 and second score 318 for each tone in second set of tones 315. In some embodiments, first score 317 and second score 318 are determined based, at least in part, on a level of intensity of each tone corresponding to a citation. In some embodiments, a level of intensity is determined by the words and/or the context of words prior to and after a citation. In some embodiments, LCA program 301 determines first score 317 and second score 318 for each tone of a corpus of tones, regardless of whether or not a tone corresponds to a citation. For example, a corpus of tones may include the following tones: "frustration," "protest," "disapproval," "approval," "support," and "doubt." LCA program 301 may determine tones of "frustration" and "objection" with respect to a citation to the legal case Howard v. Hughes in a court opinion. Here, LCA program 301 may assign scores of 0.3 for the tone "frustration" and 0.6 for the tone "objection" based on the words and/or the context of words prior to and after the citation to Howard v. Hughes. Similarly, LCA program 101 may assign a score of 0.0 for the remaining tones of the corpus of tones that do not correspond to a citation to the legal case Howard v. Hughes in the court opinion. In an embodiment, each score is a numerical fraction (e.g., 0.0 to 1.0). In an embodiment, each score is a numerical whole number (e.g., one through ten). In an embodiment, each score is a range (e.g., low, medium, or high). In other embodiments, the scores may be represented by any generally known means of ranking each tone in first set of tones 317 and second set of tones 318.

At step S403, LCA program 301 detects a set of annotations corresponding to first set of citations 309. In embodiments of the invention, LCA program 301 detects first set of annotations 311 corresponding to first set of citations 309 in plurality of legal documents 308. In embodiments of the invention, a set of annotations are case treatments associated with citations to legal cases cited in a plurality of court opinions. Here, each citation of first set of citations 309 cited to in plurality of legal documents 308 has already been previously annotated with a respective case treatment. A case treatment is a means of denoting the type of judicial treatment a legal case has received when cited in court opinions. For example, the case treatment "distinguished" indicates that a legal case is held to be inapplicable because of a difference in fact or law. In another example, the case treatment "questioned" indicates that a citing case has criticized the conclusion or reasoning of a cited case but has not directly refused to follow it. In yet another example, the case treatment "followed" indicates that a citing case has, in a majority or plurality opinion, applied a principle of law from the cited case.

In some embodiments, LCA program 301 detects an annotation through the use of Watson® Alchemy Language. In some embodiments, LCA program 301 detects an annotation through the use of text extraction software, such as NLP. In some embodiments, LCA program 301 detects an annotation through the use of approximate string matching methods (i.e., fuzzy string searching), such as edit distance. Here, the closeness of a match between a text string and a pattern is measured in terms of the number of primitive operations necessary to convert the string into an exact match. For example, LCA program 301 matches the word "limits" to the word "limited" to identify an annotation (e.g., the case treatment "limited"). In some embodiments, LCA program 301 detects an annotation by comparing words surrounding a citation to a legal case to a plurality of known case treatments. For example, the words are compared literally, semantically, and/or conceptually to the plurality of known case treatments. In embodiments of the invention, LCA program 301 uses a conceptual dictionary, such as WordNet®, to determine whether the concept underlying the words matches the concept underlying one or more of the plurality of known case treatments. In some embodiments, LCA program 301 detects an annotation corresponding to a citation to a legal case through the use of Watson® Alchemy Language.

At step S404, LCA program 301 aggregates one or more subsets for first set of annotations 311 corresponding to first set of citations 309. Each annotation in a subset of a set of annotations shares at least a first common annotation (e.g., the case treatment "followed"). In some embodiments, each annotation in a subset of a set of annotations shares at least two or more common annotations (e.g., the case treatments "followed" and "explained"). In embodiments of the invention, LCA program 301 aggregates first subset 312 of first set of annotations 311. For example, LCA program 301 detects 1,000 annotations corresponding to 1,000 citations of first set of citations 309 from plurality of legal documents 308. In this example, assume that first set of annotations 311 includes 300 annotations corresponding to the case treatment "distinguished," 200 annotations corresponding to the case treatment "followed," 100 annotations corresponding to the case treatment "questioned," 200 annotations corresponding to the case treatment "explained," 100 annotations corresponding to the case treatment "not followed," and 100 annotations corresponding to the case treatment "limited." Here, LCA program 301 aggregates first subset 312 of first set of annotations 311, wherein each annotation in first subset 312 shares at least a first common annotation (e.g., first subset 312 includes 300 annotations corresponding to the case treatment "distinguished). LCA program 101 may aggregate additional subsets of sets of annotations for each type of annotation (i.e., case treatment) in first set of annotations 311.

At step S405, LCA program 301 builds a training model, wherein the training model is built based, at least in part, from first subset 312 of first set of annotations 311 corresponding to first set of citations 309. In some embodiments, LCA program 301 builds the training model based on multiple subsets derived from multiple sets of annotations corresponding to multiple sets of citations. In some embodiments, LCA program 301 builds the training model through the use of machine learning. In machine learning, support vector machines (SVMs) are applied to analyze data and recognize patterns. An SVM is a form of computer software that includes supervised learning, wherein supervised learning is the machine learning task of inferring a function from labeled training data (i.e., training samples). In embodiments of the invention, LCA program 301 may use an SVM solver or tool, such as a library for support vector machines ("LIBSVM"). For example, LCA program 301 builds a training model based on labeled training data (e.g., known annotations corresponding to citations in legal documents). In some embodiments, LCA program 301 builds a training model with first subset 312 of first set of annotations 311 corresponding to first set of citations 309. In some embodiments, LCA program 301 builds a training model with multiple subsets derived from multiple sets of annotations corresponding to multiple sets of citations. Accordingly, LCA program 301 utilizes SVM software to infer, based on the training model, a case treatment associated with a citation that has yet to be annotated with a case treatment.

In some embodiments, LCA program 301 builds the training model from a corpus of legal documents annotated with known case treatments. In some embodiments, LCA program 301 builds the training model by mapping each annotation in first subset 312 of first set of annotations 309 to one or more tones of first set of tones 310. For example, LCA program 301 determines tones of "frustration" and "disgust" with respect to a citation to the legal case Howard v. Hughes cited in a court opinion. Based on an annotation (e.g., the case treatment "disagreed") corresponding to the citation to Howard v. Hughes cited in the court opinion, LCA program 301 trains the model by mapping tones of "frustration" and "disgust" to the case treatment "disagreed." Similarly, LCA program 301 may determine tones of "frustration" and "dissatisfaction" with respect to a citation to the legal case John v. Jackson cited in a court opinion. Based on an annotation (e.g., the case treatment "disagreed") corresponding to the citation to John v. Jackson cited in the court opinion, LCA program 301 trains the model by mapping tones of "frustration" and "dissatisfaction" to the case treatment "disagreed." LCA program 301 may repeat step S405 for each annotation in first subset 312, as well as each additional subset aggregated from first set of annotations 309. Similarly, LCA program 301 may repeat step S405 for each subset aggregated from any additional sets of annotations.

In some embodiments, LCA program 301 builds the training model by mapping each annotation in first subset 312 of first set of annotations 309 to each first score 317 corresponding to each tone of first set of tones 310. In the previous example, LCA program 301 determined tones of "frustration" and "disgust" with respect to the citation to the legal case Howard v. Hughes cited in a court opinion. In this example, LCA program may further determine first score 317 of 0.7 for the tone of "frustration" and first score 317 of 0.9 for the tone of "disgust" corresponding to the citation to Howard v. Hughes cited in the court opinion. Based on an annotation (e.g., the case treatment "disagreed") associated with the citation to Howard v. Hughes cited in the court opinion, LCA program 301 trains the model by mapping the tone of "frustration" (first score 317 of 0.7) and the tone of "disgust" (first score 317 of 0.9) to the case treatment "disagreed". Similarly, LCA program 301 may determine first score 317 of 0.8 for the tone of "frustration" and first score 317 of 0.6 for the tone of "dissatisfaction" corresponding to the citation to John v. Jackson cited in the court opinion. Based on an annotation (e.g., the case treatment "disagreed") associated with the citation to John v. Jackson cited in the court opinion, LCA program 301 trains the model by mapping the tone of "frustration" (first score 317 of 0.8) and the tone of "dissatisfaction" (first score 317 of 0.6) to the case treatment "disagreed."

At step S406, LCA program 301 determines second set of annotations 316 corresponding to second set of citations 314 in first legal document 313. Each citation of second set of citations 314 cited in first legal document 313 has yet to be annotated with a respective case treatment and corresponds to a respective case treatment. In some embodiments, LCA program 301 determines each annotation of second set of annotations 316 based, at least in part, on analyzing the training model and mapping, according to the training model, at least one tone corresponding to each citation in second set of citations to a case treatment. For example, LCA program 301 detects a citation to the legal case Mark v. Michaels cited in a court opinion. Here, the citation to Mark v. Michaels cited in the court opinion is devoid of any associated annotations. In this example, assume that LCA program 301 also determines tones of "frustration" and "disgust" corresponding to the citation to Mark v. Michaels cited in the court opinion. Based on determining tones of "frustration" and "disgust," LCA program 301 analyzes the training model to map the tones "frustration" and "disgust" to the case treatment "criticized."

In some embodiments, LCA program 301 further determines each annotation of second set of annotations 316 based on analyzing the training model and mapping, based on the training model, at least one second score 318 of at least one tone corresponding to each citation in second set of citations 314 to a case treatment. Continuing with the previous example, LCA program 301 determines second score 318 of 0.8 for the tone of "frustration" and second score 318 of 0.7 for the tone of "disgust." Here, LCA program 301 analyzes the training model to map second scores of 0.8 and 0.7 for the tones "frustration" and "anger," respectively, to the case treatment "criticized." In some embodiments, LCA program 301 determines that a citation is associated with a case treatment if one or more tones corresponding to the citation have a score above a given threshold (e.g., the case treatment "criticized" is associated to a citation if scores corresponding to the tones of "anger" and "disgust" exceed 0.7 and 0.6, respectively). LCA program 301 may repeat step S406 for each citation in second set of citations of first legal document.

At step S407, LCA program 301 annotates each citation in second set of citations 314 of first legal document 313 with a corresponding annotation from second set of annotations 316 determined in step S406. In an embodiment, LCA program 301 annotates a citation through the use of a footnote interface that displays information about the case treatment below the text. In an embodiment, LCA program 301 annotates a citation through the use of an aligned annotation that displays information about the case treatment vertically in the text margins. In an embodiment, LCA program 301 annotates a citation through an interlinear citation that attaches the annotation directly into a text. In an embodiment, LCA program 301 annotates a citation through the use of a hover box (i.e., a graphical control element that is activated when a user moves or "hovers" a mouse pointer over its trigger area).

Figure 5:
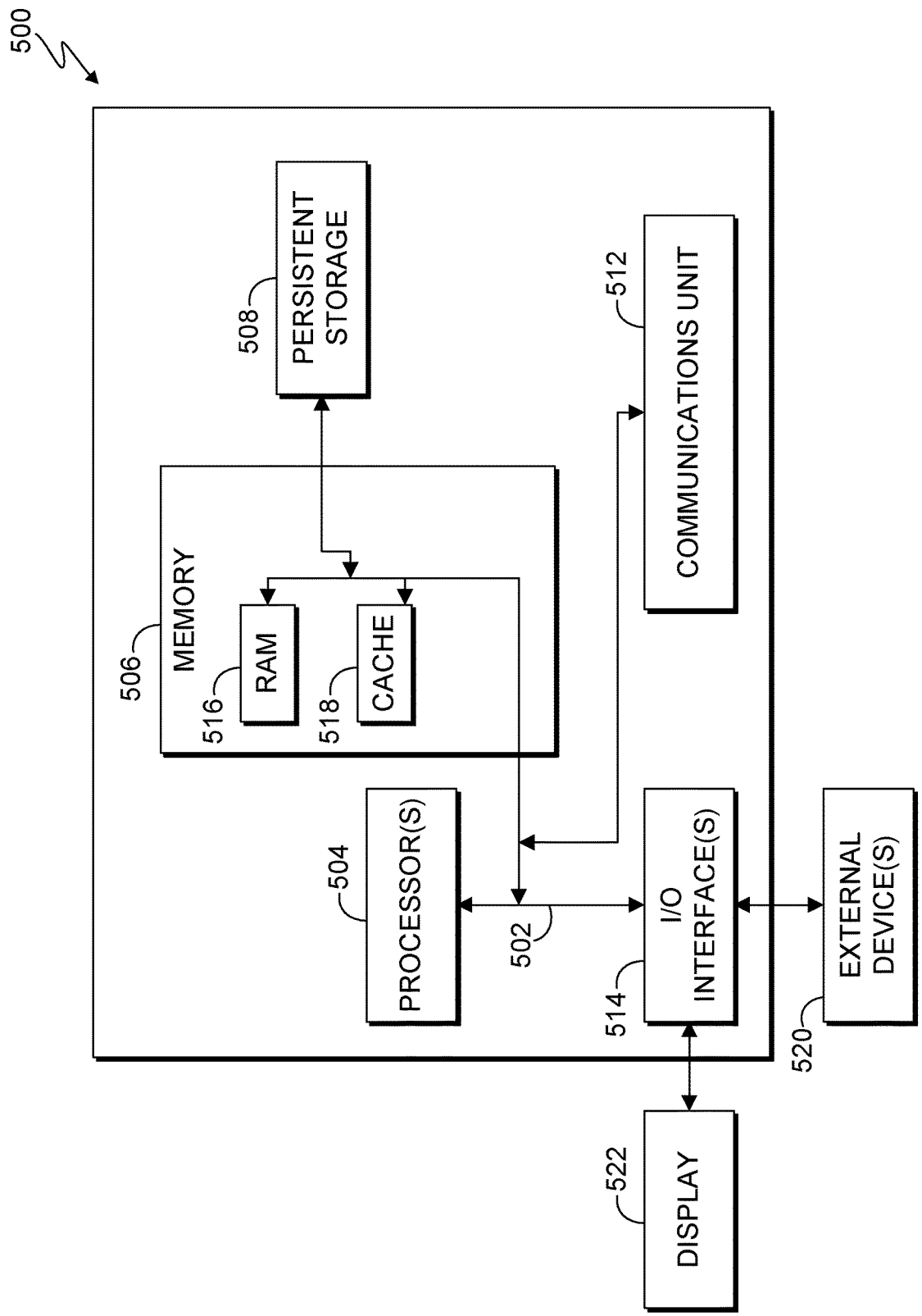
FIG. 5 is a block diagram of a computing apparatus 500 suitable for executing a legal citation analyzer program and a legal citation annotator program, respectively, in accordance with embodiments of the invention.

FIG. 5 is a block diagram depicting components of a computer 500 suitable for executing LCA program 101 and LCA program 301. FIG. 5 displays the computer 500, the one or more processor(s) 504 (including one or more computer processors), the communications fabric 502, the memory 506, the RAM 516, the cache 518, the persistent storage 508, the communications unit 512, the I/O interfaces 514, the display 522, and the external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the computer processor(s) 504, memory 506, persistent storage 508, communications unit 512, and input/output (I/O) interface(s) 514. The communications fabric 502 may be implemented with any architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a random access memory (RAM) and a cache 518. In general, the memory 506 may comprise any suitable volatile or non-volatile one or more computer readable storage media.

Program instructions for LCA program 101 and LCA program 301 may be stored in the persistent storage 508, or more generally, any computer readable storage media, for execution by one or more of the respective computer processors 504 via one or more memories of the memory 506. The persistent storage 508 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 512, in these examples, provides for communications with other data processing systems or devices. In these examples, the communications unit 512 may comprise one or more network interface cards. The communications unit 512 may provide communications through the use of either or both physical and wireless communications links. In the context of some embodiments of the present invention, the source of the source of the various input data may be physically remote to the computer 500 such that the input data may be received, and the output similarly transmitted via the communications unit 512.

The I/O interface(s) 514 allow for input and output of data with other devices that may operate in conjunction with the computer 500. For example, the I/O interface 514 may provide a connection to the external devices 520, which may be as a keyboard, keypad, a touch screen, or other suitable input devices. External devices 520 may also include portable computer readable storage media, for example thumb drives, portable optical or magnetic disks, and memory cards. Software and data used to practice embodiments of the present invention may be stored on such portable computer readable storage media and may be loaded onto the persistent storage 508 via the I/O interface(s) 514. The I/O interface(s) 514 may similarly connect to a display 522. The display 522 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining that a first degree of similarity between a first average score of a first type of sentiment attribute associated with a first set of citations to a case cited in a plurality of text files and a second score of the first type of sentiment attribute associated with a citation to the case cited in a first text file outside of the plurality of text files is below a first predetermined threshold;
   generating, in response to the determination that the first degree of similarity is below the first predetermined threshold, a search query based on the second score of the first type of sentiment attribute corresponding to the citation to the case cited in the first text file; and
   processing the search query to return a second text file from the plurality of text files that includes a citation to the case, wherein the citation to the case included in the second text file matches the second score of the first type of sentiment attribute corresponding to the citation to the case cited in the first text file.

2. The computer-implemented method of claim 1, further comprising:
   determining a first set of sentiment attributes corresponding to the first set of citations to the case cited in the plurality of text files; and
   generating a first score for each type of sentiment attribute associated with the citation to the case cited in the first set of citations.

3. The computer-implemented method of claim 1, further comprising:
   determining a second set of sentiment attributes corresponding to the citation to the case cited in the first text file; and
   generating a second score for each type of sentiment attribute associated with the citation to the case cited in the first text file.

4. The computer-implemented method of claim 1, further comprising:
   flagging the citation in the first text file if the first degree of similarity between the first average score of the first type of sentiment attribute associated with the first set of citations to the case cited in the plurality of text files and the second score of the first type of sentiment attribute associated with the citation to the case cited in the first text file is below the first predetermined threshold.

5. The computer-implemented method of claim 1, further comprising:
   aggregating a first portion of citations included in the first set of citations to the case cited to in the plurality of text files, wherein:
      each citation in the first portion of citations corresponds to at least a first entity; and
      each citation in the first portion of citations includes the first type of sentiment attribute.

6. The computer-implemented method of claim 5, further comprising:
   determining that a second degree of similarity between the second score of the first type of sentiment attribute associated with the citation to the case cited in the first text file and a second average score of the first type of sentiment attribute associated with the first portion of citations to the case cited in the plurality of text files is below a predetermined threshold.

7. The computer-implemented method of claim 6, further comprising:
   generating, in response to the determination that the second degree of similarity is below the first predetermined threshold, a search query based on the second score of the first type of sentiment attribute corresponding to the citation to the case cited in the first text file; and
   processing the search query to return a third text file from the plurality of text files that includes a citation from the first portion of citations, wherein the citation to the case included in the third text file matches the second score of the first type of sentiment attribute corresponding to the citation to the case cited in the first text file.

8. A computer program product, the computer program product comprising one or more computer readable storage media and program instructions stored on the one or more computer readable storage media, the program instructions comprising instructions to:
   determine that a first degree of similarity between a first average score of a first type of sentiment attribute associated with a first set of citations to a case cited in a plurality of text files and a second score of the first type of sentiment attribute associated with a citation to the case cited in a first text file outside of the plurality of text files is below a first predetermined threshold;
   generate, in response to the determination that the first degree of similarity is below the first predetermined threshold, a search query based on the second score of the first type of sentiment attribute corresponding to the citation to the case cited in the first text file; and
   process the search query to return a second text file from the plurality of text files that includes a citation to the case, wherein the citation to the case included in the second text file matches the second score of the first type of sentiment attribute corresponding to the citation to the case cited in the first text file.

9. The computer program product of claim 8, further comprising program instructions to:
   determine a first set of sentiment attributes corresponding to the first set of citations to the case cited in the plurality of text files; and
   generate a first score for each type of sentiment attribute associated with the citation to the case cited in the first set of citations.

10. The computer program product of claim 8, further comprising program instructions to:
    determine a second set of sentiment attributes corresponding to the citation to the case cited in the first text file; and
    generate a second score for each type of sentiment attribute associated with the citation to the case cited in the first text file.

11. The computer program product of claim 8, further comprising program instructions to:
    flag the citation in the first text file if the first degree of similarity between the first average score of the first type of sentiment attribute associated with the first set of citations to the case cited in the plurality of text files and the second score of the first type of sentiment attribute associated with the citation to the case cited in the first text file is below the first predetermined threshold.

12. The computer program product of claim 8, further comprising program instructions to:
aggregate a first portion of citations included in the first set of citations to the case cited to in the plurality of text files, wherein:
each citation in the first portion of citations corresponds to at least a first entity; and
each citation in the first portion of citations includes the first type of sentiment attribute.

13. The computer program product of claim 12, further comprising program instructions to:
determine that a second degree of similarity between the second score of the first type of sentiment attribute associated with the citation to the case cited in the first text file and a second average score of the first type of sentiment attribute associated with the first portion of citations to the case cited in the plurality of text files is below a predetermined threshold.

14. The computer program product of claim 13, further comprising program instructions to:
generate, in response to the determination that the second degree of similarity is below the first predetermined threshold, a search query based on the second score of the first type of sentiment attribute corresponding to the citation to the case cited in the first text file; and
process the search query to return a third text file from the plurality of text files that includes a citation from the first portion of citations, wherein the citation to the case included in the third text file matches the second score of the first type of sentiment attribute corresponding to the citation to the case cited in the first text file.

15. A computer system, the computer system comprising:
one or more computer processors;
one or more computer readable storage media;
computer program instructions;
the computer program instructions being stored on the one or more computer readable storage media for execution by the one or more computer processors; and
the computer program instructions comprising instructions to:
determine that a first degree of similarity between a first average score of a first type of sentiment attribute associated with a first set of citations to a case cited in a plurality of text files and a second score of the first type of sentiment attribute associated with a citation to the case cited in a first text file outside of the plurality of text files is below a first predetermined threshold;
generate, in response to the determination that the first degree of similarity is below the first predetermined threshold, a search query based on the second score of the first type of sentiment attribute corresponding to the citation to the case cited in the first text file; and
process the search query to return a second text file from the plurality of text files that includes a citation to the case, wherein the citation to the case included in the second text file matches the second score of the first type of sentiment attribute corresponding to the citation to the case cited in the first text file.

16. The computer system of claim 15, further comprising program instructions to:
determine a first set of sentiment attributes corresponding to the first set of citations to the case cited in the plurality of text files; and
generate a first score for each type of sentiment attribute associated with the citation to the case cited in the first set of citations.

17. The computer system of claim 15, further comprising program instructions to:
determine a second set of sentiment attributes corresponding to the citation to the case cited in the first text file; and
generate a second score for each type of sentiment attribute associated with the citation to the case cited in the first text file.

18. The computer system of claim 15, further comprising program instructions to:
flag the citation in the first text file if the first degree of similarity between the first average score of the first type of sentiment attribute associated with the first set of citations to the case cited in the plurality of text files and the second score of the first type of sentiment attribute associated with the citation to the case cited in the first text file is below the first predetermined threshold.

19. The computer system of claim 15, further comprising program instructions to:
aggregate a first portion of citations included in the first set of citations to the case cited to in the plurality of text files, wherein:
each citation in the first portion of citations corresponds to at least a first entity; and
each citation in the first portion of citations includes the first type of sentiment attribute.

20. The computer system of claim 19, further comprising program instructions to:
determine that a second degree of similarity between the second score of the first type of sentiment attribute associated with the citation to the case cited in the first text file and a second average score of the first type of sentiment attribute associated with the first portion of citations to the case cited in the plurality of text files is below a predetermined threshold;
generate, in response to the determination that the second degree of similarity is below the first predetermined threshold, a search query based on the second score of the first type of sentiment attribute corresponding to the citation to the case cited in the first text file; and
process the search query to return a third text file from the plurality of text files that includes a citation from the first portion of citations, wherein the citation to the case included in the third text file matches the second score of the first type of sentiment attribute corresponding to the citation to the case cited in the first text file.

* * * * *